United States Patent [19]

Scheucher et al.

[11] Patent Number: 5,417,865
[45] Date of Patent: May 23, 1995

[54] METHOD AND DEVICE FOR THE DETECTION AND REMOVAL OF BULGES IN CONTINUOUS STRIPS OF MATERIAL

[75] Inventors: Peter Scheucher; Giselher Stummer, both of Kumberg, Austria

[73] Assignee: Andritz-Patenverwaltungs-Gesell-schaft M.B.H., Graz, Austria

[21] Appl. No.: 117,145

[22] PCT Filed: Mar. 9, 1992

[86] PCT No.: PCT/AT92/00031
§ 371 Date: Nov. 5, 1993
§ 102(e) Date: Nov. 5, 1993

[87] PCT Pub. No.: WO92/15448
PCT Pub. Date: Sep. 17, 1992

[30] Foreign Application Priority Data

Mar. 11, 1991 [AT] Austria ................. A516/91

[51] Int. Cl.6 ............................................. B01D 33/80
[52] U.S. Cl. ........................... 210/739; 100/50; 100/99; 210/90; 210/91; 210/224; 210/400; 210/770; 210/808
[58] Field of Search ............... 210/86, 90, 91, 143, 210/224, 225, 387, 400, 401, 739, 741, 770, 808, 783, 85, 180; 100/43, 50, 99, 104; 73/862.471, 862.473

[56] References Cited

U.S. PATENT DOCUMENTS

| 1,743,117 | 1/1930 | Cooper | 210/90 |
| 3,969,668 | 7/1976 | Weinzinger | 324/34 R |
| 4,650,571 | 3/1987 | Anderson | 210/90 |
| 4,777,729 | 10/1988 | Häusler | 33/147 L |
| 4,834,884 | 5/1989 | Bergloff et al. | 210/401 |
| 4,851,119 | 7/1989 | Bergloff et al. | 210/741 |
| 4,855,062 | 8/1989 | Oelbermann | 210/741 |
| 4,861,495 | 8/1989 | Pietzsch | 210/739 |
| 5,109,764 | 5/1992 | Kappel et al. | 210/401 |
| 5,203,996 | 4/1993 | Scheucher et al. | 210/401 |

FOREIGN PATENT DOCUMENTS

| 8606471 | 11/1986 | European Pat. Off. | 210/225 |
| 0283870 | 3/1988 | European Pat. Off. | 210/387 |
| 360273 | 3/1990 | European Pat. Off. | 210/224 |
| 2635272 | 2/1990 | France | 210/225 |
| 3715828 | 11/1988 | Germany | 210/401 |
| 2082218 | 3/1982 | United Kingdom | 210/400 |
| 2221627 | 2/1990 | United Kingdom | 210/224 |

*Primary Examiner*—Joseph W. Drodge
*Attorney, Agent, or Firm*—Roylance, Abrams, Berdo & Goodman

[57] ABSTRACT

The invention concerns a method of detecting and removing bulges in continuous strips of material before they enter higher-pressure zones in a dewatering filter press. The method is characterized in that, when a bulge occurs, a sensor is deflected and a control signal generated. The invention also concerns a device for carrying out the method, the device being characterized in that it is fitted with a preferably pressure-tight sensor which is deflected when a bulge occurs in the strip of material being filtered and can be reset when the bulge disappears.

19 Claims, 3 Drawing Sheets

METHOD AND DEVICE FOR THE DETECTION AND REMOVAL OF BULGES IN CONTINUOUS STRIPS OF MATERIAL

The invention relates to a method of detecting and removing bulges in continuous strips of material before they enter higher pressure zones and a device for carrying out this method.

In dewatering machines in which a filter cake is formed between two belts, this filter cake does not enter the next zone of higher pressure with the belts when its stability is too low. This causes the filter cake or the filter belts to form a "bulge". If the marginal zones are open, the filter cake, e.g. community sludge, brims over the edges and thus pollutes the machine and the environment. In closed machines, this bulge is not detected until the belts get stuck. In order to restart the machine, it must be dismantled and cleaned, which causes extended standstill. The availability of the machine is thus very low, particularly at changing stability of the filter cake.

It is the object of the invention to provide a method for the detection and removal of bulges in continuous strips of material before they enter pressure zones which is free of the above-mentioned drawbacks. This is achieved according to the invention in the method initially mentioned by providing for a sensor to be deflected on the occurrence of a bulge and a control signal to be generated. This means that upstream of each pressure zone, or in case of a plurality of pressure zones, upstream of each one of these pressure zones, a bulge is detected by scanning the upper belt by deflecting a sensor and operating parameters such as machine speed or pressure in the individual pressure zones are controlled by this signal and the bulge is thus removed. This eliminates the cleaning of machines and environment and in case of closed machines the dismantling otherwise required, which considerably increases the availability of the machine.

On the occurrence of bulges caused by pressure, the operating pressure of the respective pressure zone is conveniently reduced step by step until the bulge has disappeared. This operation always results in the adjustment of the highest possible compressive force without causing bulges. This permits an adjustment to the respective material parameters of the filter cake.

A further embodiment of the method is characterized in that on falling short of a limiting value, the pressure in the zone upstream of the belt advancing direction is also reduced.

It is further convenient in the event of falling short of a pressure limiting value of the pressure zone located upstream for the pressure in the pressure zones located further upstream to be correspondingly reduced, the pressure in the individual pressure zones in the belt advancing direction each being equal to or higher than that of the zone upstream. This also automatically adjusts the differential pressure between the individual pressure zones to various conditions of the filter cake and thus permits a maximum dry matter content (maximum dehydration) of the filter cake with retention of operational safety.

It is further convenient to increase the pressure in the respective zone after expiration of a waiting period following the elimination of the bulge. This adjusts the maximum pressure in each zone just below that causing a bulge.

A further object of the invention is a device for carrying out the method according to the invention for the detection and removal of bulges in strips of material before they enter pressure zones, the device being characterized in that is it provided with a preferably pressure-tight sensor which is deflected when a bulge occurs in the strip of material and is resettable when the bulge disappears. This embodiment assures the detection of a bulge in the strip of material at all times.

A convenient embodiment of the device according to the invention is characterized in that the sensor is composed of a proximity switch and a disk moving on the deflection of a pitoval detecting element of the sensor.

The disk is conveniently biassed in the direction of the proximity switch by means of a spring. This provides for a defined location of the disk in its normal position which is only changed on exceeding a corresponding actuating force generated by deflecting the sensor and generating a corresponding pulse of the proximity switch.

It is particularly convenient for the disk to be connected to a cord, rope or wire attached to a pin in the pivotal detecting element. This embodiment of the sensor permits its production in a simple manner and its functioning is assured at all times because the connection of the disk to the pivotal detecting element by means of e.g. a cord is only subjected to traction.

A further embodiment of the device according to the invention is characterized by the pressure-tight installation of the sensor. Such an embodiment permits safe operation of the machine as compared to known sensors.

A convenient further development of the device according to the invention is characterized in that the sensor is connected to a freely programmable control.

A further embodiment is characterized in that the freely programmable control is connected to pressure governors for the individual pressure zones. By this embodiment of the device, the method according to the invention, in particular the control of the machine, may be effected in a simple manner.

The invention is explained in the following by means of an exemplary embodiment with reference to the accompanying drawings. In the drawings, FIG. 1 is a longitudinal section through a high-pressure dewatering machine;

Figure 1:
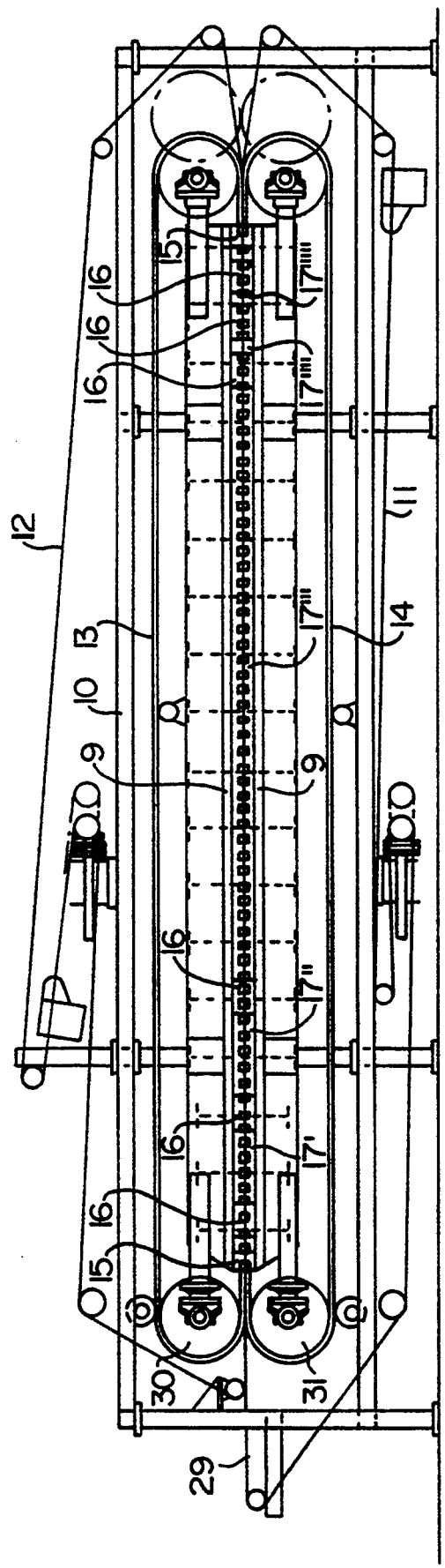

FIG. 1 shows a high-pressure dewatering machine for the dewatering of material suspensions. The material is placed onto a lower screen 11 at 29, covered by an upper screen 12 and subsequently introduced between an upper belt 13 and a lower belt 14 at the reversing rolls 30 and 31. The entire device is contained in a stand 10. The dewatering of the material is achieved by the exertion of pressure in various pressure stages. Reference number 9 designates the upper and lower frames of the operating area. Sealing of the entire pressure area is effected by means of one each secondary seal 15 at the inlet and outlet for the material. The separation of the individual pressure areas is effected by means of pressure boxes 16. The pressure areas 17', 17", 17''' are subject to increasing pressure, the following pressure areas 17'''', 17''''' are subject to correspondingly reduced pressure. Maximum pressure prevails in the pressure area 17''' and most of the dewatering takes place there.

Figure 2:
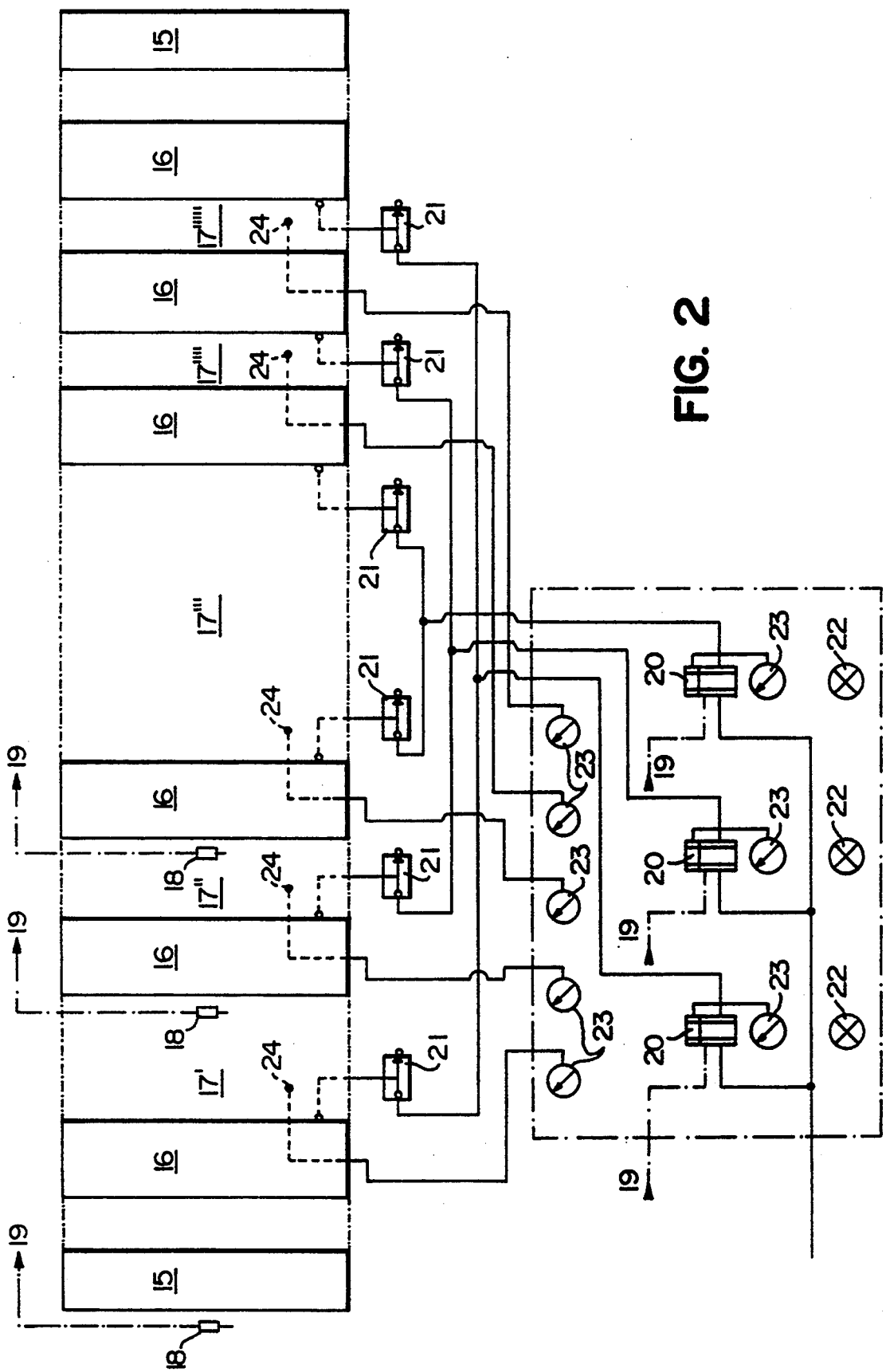
FIG. 2 shows the regulatory scheme of the plant.

FIG. 2 shows a schematic representation of the structure of a machine in which the invention is applied and also shows the structure of the regulatory circuits. The secondary seals are again designated by 15 and the pressure boxes for separating the individual pressure zones bear the reference number 16. In conformity with FIG. 1, the individual pressure zones bear the reference numbers 17', 17'', 17''', 17'''', 17'''''. In front of the individual pressure boxes 16, the sensors or pivotal detecting elements 18 provided according to the invention are represented in an exemplary manner as connected to a freely programmable control 19. The signals of the pivotal detecting elements 18 act via the freely programmable control 19 onto a corresponding pressure regulating valve 20 which in turn actuates a quick vent valve 21. Pressure sensors 24 disposed in the individual pressure areas 17', 17'', 17''', 17'''', 17''''' provide the actual value on a corresponding pressure gauge 23 on the control panel.

On the occurrence of a bulge, the corresponding pivotal detecting element 18 is deflected and sends a signal to the freely programmable control 19 and a corresponding control light 22.

The regulation can basically be effected in two different ways:

1. When a bulge is detected, the regulator reduces all pressures to the minimum value of the respective zone. This pressure is maintained until the bulge alert disappears. Subsequently, the pressure in the zone in which the bulge had occurred is reduced to a certain amount. If no further bulge occurs during a predetermined waiting period, the pressure in the zone is increased by the amount previously reduced. Should a further bulge occur prior to expiration of the waiting period, the pressure is further reduced to a certain amount and the waiting period starts all over again. This adjusts the maximum pressure just below the pressure in each zone causing bulges.

2. On the occurrence of a bulge, the pressure in the respective zone is reduced step by step until the bulge has disappeared. In the event that this causes the pressure to reach the value of the zone upstream in advancing direction of the strip, this pressure is also reduced step by step. This is subject to the condition that the pressure in the individual zones in advancing direction of the strip up to the main dewatering zone must be increased, but must at least be equal to the pressure in the zone upstream.

Figure 3:
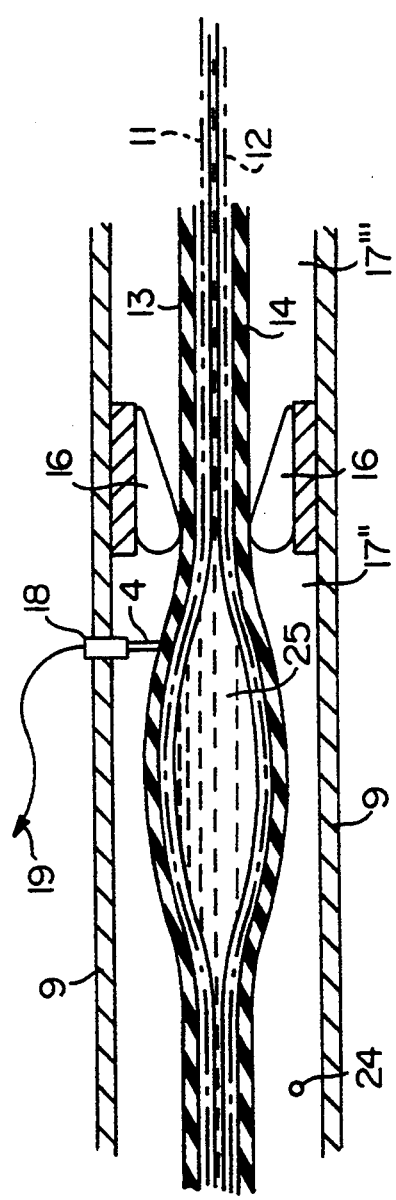
FIG. 3 represents a detail of FIG. 1 with built-in sensor and a bulge in the strips and FIG. 4 shows the sensor according to the invention.

The function of the device is explained with reference to FIG. 3, the occurrence of a bulge being represented in an exemplary manner in pressure area 17''. The separation from pressure area 17''' is effected by means of the pressure box 16 acting as a seal. This figure shows the upper and lower frames of the operating area 9. The reference number 11 is used for the upper screen, 12 designates the lower screen between which the filter material to be dewatered is located. The screens 11, 12 are covered by upper belt 13 and lower belt 14. The compressive force used for dewatering is in this case exerted by pressure water 24 onto the belts 13, 14. On the occurrence of a bulge, the detecting element 4 of the sensor (pivotal detecting element) 18 is deflected. The signal transmitted to the control 19 then correspondingly regulates the pressure of the individual pressure areas or pressure zones so that the maximum pressure and thus the maximum dewatering performance is achieved without the occurrence of bulges at the respective properties of the filter cake 25.

Figure 4:
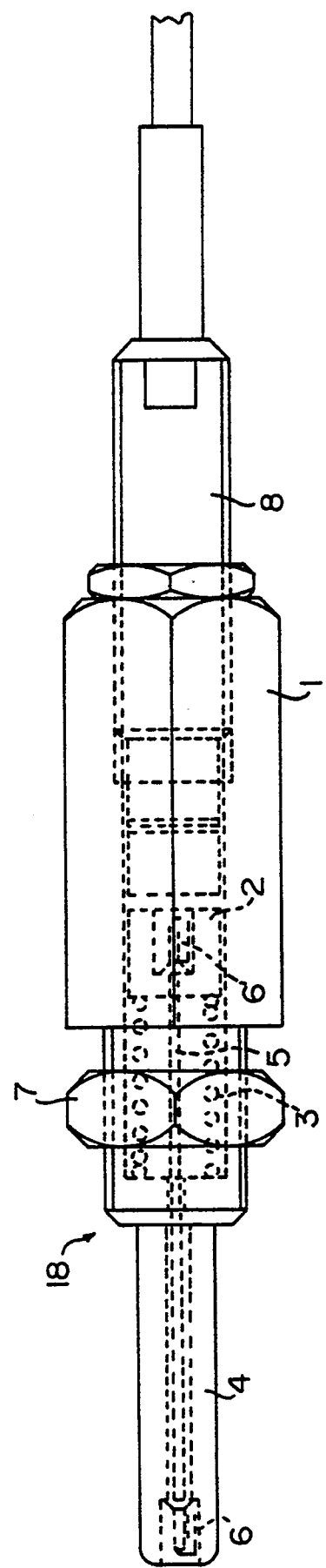

The sensor or pitoval detecting element 18 employed according to the invention is represented in detail in FIG. 4. It consists of a sleeve 1 into which an inductive proximity switch 8 is screwed and fixed by means of a counter nut (not shown in FIG. 4) in respect of its distance to a disk 2 located on the other side of the sleeve 1. The disk 2 is biassed in the direction of the proximity switch 8 by means of a spring 3. Adjustment of the position of the detecting element 4 in respect of the frame 9 is effected by means of a nut 7. The detecting element 4 of the sensor 18 is connected to the disk 2 by means of a wire 5 attached to the pins 6. On deflection of the detecting element 4, the wire is retracted and the disk 2 is thus removed from the proximity switch 8. This generates a signal to which the control responds.

This invention is suitable for use not only in high-pressure dewatering machines, but also in any other plant in which webs of material are subjected to various pressures and bulges may occur. In particular, the use of pressure rolls is possible.

We claim:

1. A device adapted for filtering material while detecting and removing at least one bulge in a continuous strip of material to be filtered in a continuous filter-press comprising a plurality of pressure zones of a dewatering machine, said device comprising a pair of opposing continuous filter belts for receiving said material to be filtered, a sensor device disposed within said dewatering machine and upstream of a first high pressure zone, said sensor being tiltable on the occurrence of a bulge in the strip of material and retractable following the disappearance of the bulge.

2. The device according to claim 1, wherein the sensor consists of a proximity switch and a disk moving on deflection of a pivotal detecting element by means of a spring.

3. The device according to claim 2, wherein the disk is biased toward said proximity switch by means of said spring.

4. The device according to claim 3, wherein the disk is connected to a cord, rope or wire attached to a pin in said pivotal detecting element.

5. The device according to claim 1, wherein the sensor is installed pressure-tight.

6. The device according to claim 1, wherein the sensor is connected to a freely programmable control.

7. The device according to claim 6, wherein the freely programmable control is connected to pressure regulators for each of said pressure zones.

8. The device according to claim 1, wherein said sensor comprises means to detect bulges formed in a longitudinal direction with respect to said filter belts.

9. The device according to claim 1, wherein said sensor comprises a tiltable member proximate one of said filter belts whereby a bulge in said material tilts said tiltable member of said sensor.

10. The device according to claim 1, further comprising means for incrementally reducing pressure in said first high pressure zone until said bulge has disappeared.

11. The device according to claim 10, further comprising increasing the pressure in said first high pressure zone after a waiting period following the disappearance of the bulge.

12. The device according to claim 1, further comprising a second sensor upstream of a second high pressure zone and being tiltable upon the occurrence of a bulge, and means for reducing the pressure in said second high pressure zone upon the occurrence of a bulge, the pressure in said second high pressure zone being equal to or higher than the pressure in said first high pressure zone.

13. A method of detecting and removing at least one bulge in a material being filtered between a pair of opposing continuous filter belts, comprising the steps of:

advancing said filter belts with said material therebetween through a plurality of pressure zones of a dewatering machine;

advancing said filter belts past a sensor located within said dewatering machine and in a first zone upstream of a first high pressure zone whereby a bulge in said material contacts and tilts said sensor thereby detecting said bulge; and generating a control signal in response to said tilting of said sensor.

14. The method according to claim 13, further comprising the step of reducing the operating pressure on said filter belts in said first pressure zone step by step until the bulge has disappeared.

15. The method according to claim 14, further comprising the step of reducing the pressure in a second pressure zone upstream of said first pressure zone after reducing the pressure in said first zone.

16. The method according to claim 15, further comprising the step of subsequently reducing the pressure in a third pressure zone upstream of said second pressure zone, whereby the pressure in each of said pressure zones is equal to or higher than an adjacent pressure zone in the advancing direction of said filter belts.

17. The method according to claim 14, further comprising the step of increasing the pressure in said first pressure zone after expiration of a waiting period following the disappearance of the bulge.

18. The method according to claim 13, further comprising detecting a bulge formed in a longitudinal direction with respect to said filter belts.

19. The method according to claim 13, wherein said sensor is a tiltable sensor proximate one of said filter belts, said method comprising advancing said filter belts past said sensor whereby a bulge in said material tilts said sensor.

* * * * *